United States Patent [19]

Gribanov et al.

[11] 4,452,534

[45] Jun. 5, 1984

[54] METHOD OF DETERMINING GEOMETRIC PARAMETERS OF OBJECT'S SURFACE AND DEVICE THEREFOR

[76] Inventors: Dmitry D. Gribanov, ulitsa Chusovskaya, 11, korpus 6, kv. 35, Moscow; Vladimir P. Kulesh, ulitsa Stroitelnaya, 6, kv. 29, Zhukovsky Moskovskoi oblasti; Appolinary K. Martynov, 3 Frunzenskaya ulitsa, 3, kv. 40, Moscow; Anatoly A. Orlov, Naberezhnaya Tsialkovskogo, 22, kv. 82; Tatyana G. Semikova, ulitsa Mayakovskogo, 17, kv. 37, both of Zhukovsky, Moskovskoi oblasti; Sergei D. Fonov, Balashikhinsky raion, poselok Zarya, 180, kv. 52, Moskovskaya oblast; Leonid M. Moskalik, ulitsa Molodezhnaya, 13, kv. 177, Zhukovsky, Moskovskoi oblasti, all of U.S.S.R.

[21] Appl. No.: 298,479

[22] Filed: Sep. 1, 1981

[51] Int. Cl.$^3$ ............................................. G01B 9/02
[52] U.S. Cl. ..................................... 356/359; 356/376
[58] Field of Search ............... 356/347, 348, 353, 359, 356/360, 371, 374, 376

[56] References Cited

U.S. PATENT DOCUMENTS

| | | | |
|---|---|---|---|
| 3,592,548 | 7/1971 | Majkowski | 356/347 X |
| 3,619,064 | 11/1971 | Brooks et al. | 356/347 |
| 3,907,438 | 9/1975 | Holeman | 356/360 X |
| 3,911,733 | 10/1975 | Bhuta et al. | 356/347 X |
| 4,030,830 | 6/1977 | Holly | 356/359 |

*Primary Examiner*—Vincent P. McGraw
*Assistant Examiner*—Matthew W. Koren
*Attorney, Agent, or Firm*—Murray Schaffer

[57] ABSTRACT

A method is based on utilization of interference patterns for determining an increment of a third coordinate with two given coordinates. An interference pattern is produced on a surface under investigation whereupon one of interference bands is marked to obtain a zero reference band. The subsequent step is to determine the attitude of an interference extremum surface corresponding to said reference band. Thereafter the period of all extremums is distributed along the axis of the third coordinate and an increment of the third coordinate is determined relative to the surface of the zero band by adding up values of periods of surfaces corresponding to bands between the zero reference point and two predetermined reference points.

A device for accomplishing the hereinproposed method comprises an optical system for producing an interference pattern, a photorecorder to record said pattern, a coordinate setting unit, and a unit for determining the number of the band of the recorded interference pattern. The device also includes a zero band marker, an assembly for determining the attitude of extremums and the period therebetween, and a unit for determining the third coordinate, which incorporates a processor with a storage device.

5 Claims, 12 Drawing Figures

METHOD OF DETERMINING GEOMETRIC PARAMETERS OF OBJECT'S SURFACE AND DEVICE THEREFOR

BACKGROUND OF THE INVENTION

The present invention relates to measuring techniques, more particularly to a method of determining geometric parameters of an object's surface and a device therefor. It may be used to advantage in determining shape and deformation of objects and for measuring the path of a moving object, for example determining the deformation and path of blades of a helicopter rotor.

Besides, the invention may find wide applications in precision determination of a third coordinate of surface with two known quantities as is often the case in machine building and various measurements, particularly in noncontact measurements.

An extremely difficult problem of current interest is the noncontact determination of geometric parameters of objects' surfaces such, for example, as surfaces of various elements of flight vehicles, ships, machine structures and water surfaces, as well as determination of shape, position, movement and deformation of such surfaces. Known in the art is a great number of noncontact optical methods and devices based on holographic, moire' and light interference principles designed to meet specific requirements relating to the above problem.

Known in the art is a method of determining geometric parameters of an object's surface (cf. U.S. Pat. No. 3,619,064, Cl. 356/109 "Moire' Measuring System" granted to Robert Brookes on Nov. 9, 1971).

The aforesaid method comprises the steps of producing an interference pattern on a surface under investigation, projecting thereon at an angle with respect to each other two beams of coherent light, recording said interference pattern, producing thereafter the same interference pattern on the object's surface at another moment or on the surface of another object, aligning the latter pattern with the one recorded previously and determining a change in the shape of the object's surface or a difference between shapes of surfaces of the two objects being compared.

However, the moire' method permits determining only a difference in the shape of the object's surface at different moments or a difference in the shapes of the surfaces of two objects, which can be utilized for measuring deformation of the object or for comparing the objects with a reference. A disadvantage of the aforesaid method is that actual or true shape and attitude of the object surface may not be determined.

Furthermore, the moire' method when used for determining deformation for comparing with a reference introduces a considerable error equalling half a period of interference bands with a comparatively small variation of geometric parameters due to the inherent condition that the period of moire' bands should exceed by several times the period of an interference pattern on the surface under investigation.

Also known in the art is a method of determining geometric parameters of an object (cf. U.S. Pat. No. 3,907,438, Cl. 356/156 "System for Measuring Cylinder Loop" granted to John Holeman on Sep. 23, 1975). With such a method, an interference pattern is produced on the surface of an object under investigation, said pattern being subsequently recorded, while desired geometric parameters are determined with due regard for the number and shape of interference bands on the recorded image.

With two intersecting beams of coherent light projected onto the surface at a non-zero incidence angle, interference patterns are formed on the surface, which represent lines of intersection of the surface under investigation and the surfaces of interference extremums in space.

Thus, the interference bands on the surface under investigation represent topographic level contours set by the surfaces of interference extremums. Knowing the angle between the beams $\alpha$ it is possible to determine the period of the interference extremums S by the formula $$S = \frac{\lambda}{2 \sin \frac{\alpha}{2}} \quad (1)$$

where $\lambda$ is light wavelength.

Determining the charging number of the interference band $\Delta n$ at each point set by two coordinates, X and Y, on the surface with respect to another (reference) point and knowing the period of the interference extremums S and the angle of incidence of beams on the surface $\theta$ it is possible to find relative deviation of a given point on the surface on the third coordinate $\Delta Z$:

$$\Delta Z = \frac{S}{\cos \theta} \Delta n = \Lambda \cdot \Delta n \quad (2)$$

Measuring a change in the band number allows determining integral and fractional parts of an interval between the deviation bands. Therefore, the measuring accuracy of the aforesaid method is higher than that in the case of the moire' method.

Moreover, no limitation is imposed on the range of measured deviations of the surface, which is an apparent advantage over the moire' method.

However, the two prior art methods make it possible to determine only relative deviation of shape of the surface under investigation from the original or reference surface, a serious disadvantage being that true shape, attitude and movement of the surface may not be determined.

Another disadvantage of the known method is the need for producing and projecting on the investigated surface two collimated light beams with values S and $\theta$ being constant in the entire intersection area. Thus, the section of collimated beams determines the size of surfaces under investigation. This excludes the possibility of investigating real large objects such, for instance, as airfoils of flight vehicles.

If the surface under investigation is struck by two diverging beams of coherent light, the values of parameters S and $\theta$ will be different at different points in the area of intersection of the beams. In this case problems of determining relative changes in the shape of the surface may not be properly solved unless prior information on displacement of at least one point on the surface is available.

One more disadvantage of the aforesaid method is that the number of the band on the recorded pattern is determined either by visual counting or by photometric evaluation of the image and the counting of maximum and minimum blackening densities.

In the former case there may be considerable subjective errors, while in the latter case the occurrence of counting errors may be the result, said counting errors being attributed to spurious maximum and minimum image blackening densities due to non-uniformity of reflectivity of the investigated surface, presence of small elements, irregularities and defects thereon, porosity or granular structure of photosensitive material used for image recording, and other possible causes such as image defects occurring in recording, etc. An apparent disadvantage of the foregoing method is, therefore, inadequate accuracy and reliability of measurements.

A known device for determining geometric parameters of an object's surface comprises an optical system for producing two beams of coherent light and projecting said beams on the surface under investigation, a photorecorder for recording an interference pattern on said surface, and an assembly for measuring coordinates and the number of bands of the interference pattern (cf. U.S. Pat. No. 3,907,438). To illuminate surfaces of large objects, the optical system may include means for producing two diverging beams of coherent light (cf. U.S. Pat. No. 3,619,064, Cl. 356/109).

However, the known device permits determining only the relative increment of the coordinate at a given point with respect to the coordinate at other points on the surface. Thus, the device does not respond to general movements of the object's surface and to its shape. In the case of large objects the known device allows determininig relative movements only when additional information on displacement of at least one point on the surface is obtained from other sources. In other instances the device may be used only to obtain precise data on geometric parameters of the surface under investigation.

Another disadvantage of the aforesaid device is that the known construction of the unit for measuring the number of bands of the recorded interference pattern does not ensure adequate accuracy and reliability of measurements due to the existance of a subjective factor in the process and also because of inherent sensitivity to defects and secondary elements of the recorded image and photorecording material.

Furthermore, such construction makes it impossible to automatically analyze the recorded pattern primarily due to high probability of spurious counts and low noise immunity. Therefore, the analysis of images with a view to obtaining precise data on geometric parameters entails an intricate, long and labour-consuming process.

It is an object of the present invention to provide a method for the noncontact determination of basic geometric parameters of object's surface such as shape, attitude, motion, and deformation.

Another object of the invention is to provide a method for the noncontact determination of said geometric parameters without using any prior information on motion and shape of objects.

One more object of the invention is to provide a method and a noncontact measuring device therefor possessing high precision, reliability, and repeatability of results.

A still another object of the invention is to provide a noncontact measuring device for executing said method, which is characterized by automatic measuring cycle and data processing without any subjective elements.

SUMMARY OF THE INVENTION

The foregoing and other objects of the invention are accomplished by that a method of determining geometric parameters of object's surface comprising the steps of producing an interference pattern on the surface under investigation, projecting two beams of coherent light onto said surface at an angle with respect to each other, recording said interference pattern, and determining an increment of a third coordinate using the number of the band in said recorded pattern at each point of the surface set on two coordinates. According to the invention, the method includes such additional steps as marking, before recording the interference pattern, one of interference bands to obtain a reference zero band, determining the attitude of the surface of an interference extremum corresponding to the marked zero band, and distributing in space the period of surfaces of all interference extremums along the axis of the third coordinate. The increments of the third coordinate relative to a zero band surface at desired points having two specific coordinates are determined by adding up the periods of extremum surfaces corresponding to the bands of the pattern, disposed between the zero band and the points of interest.

Such a method permits determining an increment of a desired third coordinate relative to the zero extremum surface using the recorded interference pattern and the known distribution of the interference extremum period. Since the attitude of a zero extremum surface is also known, it is possible to determine the absolute position of each point on the surface in space.

The proposed method is also capable of investigating surfaces of large objects since the measured distribution of the period of interference extremum surfaces Λ along the third desired axis Z accounts for variations of both parameters S and $\theta$ in the intersection area since $$\Lambda = S/\cos \theta$$

To mark a zero interference band, it is of advantage to provide two interference patterns characterized by similar form of distribution of interference extremums in space and having periods differing by a constant factor, which are not multiples of each other. Desirably two patterns are recorded and a zero band is the band coincident on both patterns.

Such a marking of the zero band assures formation of a single interference extremum surface in the entire area of intersection. This surface is normally contained in the plane of symmetry of the beams.

Furthermore, such a marking method is fit for interference patterns having virtually any interference extremum period.

To determine geometric parameters of a moving object, it is advantageous that an interference pattern on the object's surface should be produced using a train of short pulses.

In this case there is produced a sequence of interference patterns conveying information on the shape and position of the surface under investigation at predetermined moments whereby the path of any point on the surface of the object and dependence of its deformation on time will be determined.

The proposed method of determining geometric parameters of an object may be accomplished by the use of a device comprising an optical system for producing two beams of coherent light and projecting said beams at an angle with respect to each other on the surface under investigation. A photorecorder for recording an interference pattern on the surface, a unit for setting two coordinates, and a unit for determining the number of bands of the recorded interference pattern are provided. The unit for determining the number of bands, according to the invention, includes a marker for obtaining a reference zero interference band on object's surface, an assembly for measuring the attitude of surfaces of interference extremum surfaces and a period therebetween. The assembly comprises a holder with a photosensitive element installed in a manner allowing movement thereof and coordinate reading on three axes along and across the beams in the area of their intersection. A unit for determining a third coordinate of points on the surface is included, which incorporates a processor with a storage device coupled to the unit for setting two coordinates, to the unit for determining the number of bands relative to the zero band on the recorded pattern and to the assembly for determining attitude of surfaces of interference extremums and a period therebetween and designed so as to allow summation of the periods depending on the number of the bands disposed between the zero band and the desired point including integral and fractional parts with due account taken on the periods in the sectional area corresponding to the two measured coordinates of the point of interest and to assure its addition to the third coordinate of the zero band extremum surface in the same sectional area whereby absolute value of the third coordinate of the given point on the surface will be obtained.

In the method forming the subject of the present invention high measuring accuracy and reliability are provided by the fact that the number of the band on the recorded pattern is determined by the use of an additional pattern of moving interference bands having a size smaller than that of the recorded pattern and an interference band period equal to or multiple of the band period on the recorded pattern. Subsequently, the surface is cintually scanned with the additional pattern at two points on two preset coordinates, the additional pattern light is connected after interaction with the recorded pattern into an electrical signal, and the number of the band including its integral and fractional parts is determined by a change in the phase of alternating component of the obtained signal with respect to the signal phase at the recorded pattern points disposed within the zero band.

A change in the phase of alternating component of the obtained photoelectrical signal is equal to the number of bands on the recorded pattern crossed in scanning with the centre of the additional pattern, a whole number of phase variation cycles corresponding to a whole number of the bands crossed in scanning whereas phase variations within $2\pi$ correspond to that portion of the interval which is located between the preceding band and the current point wherein the phase is counted.

The present-day phase-angle meters have a measuring error of about 0.1°, which corresponds to approximately $3.10^{-4}$ period fraction. Thus, with the proposed method a band fraction of the recorded pattern may be measured to an accuracy of $\Lambda/10,000$ to $\Lambda/1000$ or better.

High measuring accuracy is also attributed to the fact that a photoelectrical signal is a narrow-band radio-frequency signal which may be separated from spurious signals, noise and pick-up by known radio engineering means and then adequately amplified.

Phase measurements permit averaging the measured value over a conveniently long period, an advantage enabling elimination of the effect of vibration and fluctuations in the optical and electrical signal paths.

Measurements of scanning coordinates and band number are free of such subjective elements as visual counting and manual data recording, a feature excluding the associated measuring errors.

The above factors contribute to high measuring accuracy and reliability.

The above object is also accomplished by the fact that in the device for executing the method in compliance with the invention the unit for determining the number of bands incorporates a two-stage coordinate measuring table with coordinate transmitters and electric drives, wherein the recorded pattern is disposed. An optical system for producing a pattern of moving interference bands is provided having a source of continuous-wave coherent radiation, an assembly for adjusting an interference pattern, which assembly includes appropriate transmitters and electric drives, and a photoelectrical means for detecting a portion of radiation emitted from the centre of the moving band pattern before interaction with the recorded pattern, a photoelectric means for detecting radiation interacting with the recording pattern, a phase-digital converter whose inputs are connected to the outputs of the photoelectric detectors through r-f filters, and a control microprocessor, the inputs of which are coupled to the output of the phase-digital converter, to the coordinate table transmitters and to the transmitters of the assembly for adjusting an interference pattern, the outputs of the control microprocessor being connected to the electric drives of the coordinate table and the interference pattern adjusting assembly.

In addition to high measuring accuracy and reliability, the proposed device assures a complete measuring cycle without operator's intervention, an advantage substantially simplifying, expediting and facilitating the measuring process and enabling complete automation in determining geometric parameters of an object's surfaces.

The invention will now be described further with reference to a specific embodiment given for illustrative purposes and being norestrictive in any manner, taken in conjunction with the accompanying drawings.

BRIEF DESCRIPTION OF THE DRAWINGS

FIG. 7c is a diagram illustrating variation with time of intensity of light after interaction with the recorded pattern in the embodiment of FIG. 7a;

DESCRIPTION OF THE INVENTION

Figure 1:
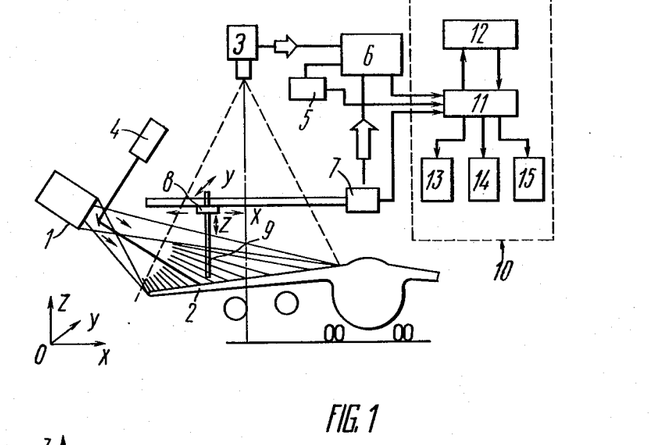
FIG. 1 is a block diagram of a device for accomplishing a method of determining geometric parameters of object's surface, according to the invention.

The device whose block diagram is given in FIG. 1 comprises an optical system 1 for producing two beams of coherent light and projecting said beams at an angle with respect to each other on a surface 2 under investigation. A photorecorder 3 is provided for recording an interference pattern formed on the surface 2, as is a marker 4 for separating a zero band on the recorded pattern, a unit 5 for setting two coordinates, a unit 6 for measuring the number of bands of the recorded pattern, and an assembly 7 for determining attitude of surfaces of interference extremums in the area of intersection of beams including a holder 8 with a photosensitive element 9 installed in a manner allowing movement thereof and coordinate reading along axes X, Y and Z. A unit 10 for determining a third coordinate of points on the surface incorporates a processor 11, a storage device 12, and peripheral devices such as a display 13, and a plotting device 15. The unit 6 is coupled to the outputs of the photorecorder 3, the unit 5 for setting said two coordinates, and the attitude measuring assembly 7, while the inputs of the processor 11 are coupled to the outputs of the unit 6 and the assembly 7.

The device forming the subject of the present invention operates in the following manner.

An interference pattern is produced on the surface 2 under investigation by the use of the optical system and two beams of coherent light are projected onto the surface 2. The two beams may be parallel, converging or diverging depending on the size of the surface under investigation and the range of measured geometric characteristics.

The photorecorder 3 is used to record the interference pattern. The photorecorder 3 may be a photo, cinema or TV camera, the obtained image being subsequently recorded on a video recorder, matrices of photosensitive elements with subsequent entry of the corresponding digital code in the storage device, and also on a photosensitive layer deposited directly on the surface under investigation. The method according to the invention may be advantageously realized by the use of a photo or cinema camera.

Figure 2A:
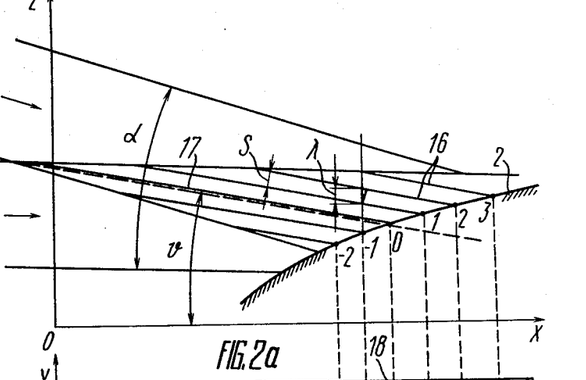
FIG. 2a diagrammatically illustrates an area of intersection of parallel beams of coherent light over a surface under investigation and depicts planes of interference extremums including a zero extremum in a coordinate plane OXZ, according to the invention.
Figure 2B:
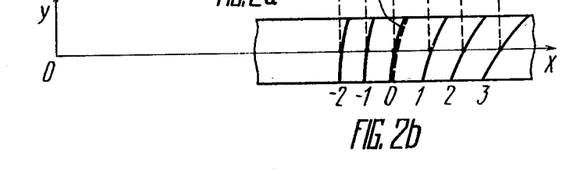
FIG. 2b diagrammatically shows interference bands on the surface in a coordinate plane OXY, according to the invention.

The unit 5 is used to set or measure two coordinates of the point of interest on the surface of the recorded pattern. Two coordinates, X and Y, of the point of interest are set in the coordinate plane OXY (FIG. 2b) substantially coincident with the investigated section of the object's surface at the initial instant and throughout the experiment or left invariable or subjected to determined displacements. The setting and measurement of two coordinates of the point of interest may be accomplished by any known method, say by plotting or projecting of a coordinate grid XY onto the surface under investigation with subsequent measurement of the number of the band on the recorded pattern at nodal points of the grid or measurement of the chosen points in the plane of the recorded pattern and recomputation of the coordinates considering the image scale.

The number of bands on the image is determined by the use of the unit 6 with respect to a predetermined band, say a reference band which is marked by the marker 4 to enable its separation on the pattern before recording. The reference zero band may be marked, say with a narrow beam of light coincident with the band chosen to be the zero band (FIG. 1). In the preferred embodiment of the device for accomplishing the herein-proposed method there is used the separation of the zero band, the essential steps of the procedure being mentioned in the description of the optical system 1.

In the area of intersection of two beams of coherent light there are formed alternating surfaces of interference extremums (minimum and maximum) which intersect with the surface of the object 2 to form, respectively, dark and light interference bands. If the intersecting beams are parallel, i.e. collimated, said surfaces represent equidistant planes 16 (FIG. 2a) parallel to each other and to the plane of symmetry of the intersecting beams. The alternation period of the like extremums 16 depends on the light wavelength λ and on the angle α between the intersecting beams, this period being determined by formula (1). When the zero band is separated by a narrow beam of light, the latter should be aligned with the entire surface 17 of the interference extremum corresponding to a band 18 (FIG. 2b) chosen to be the zero band.

Figure 3:
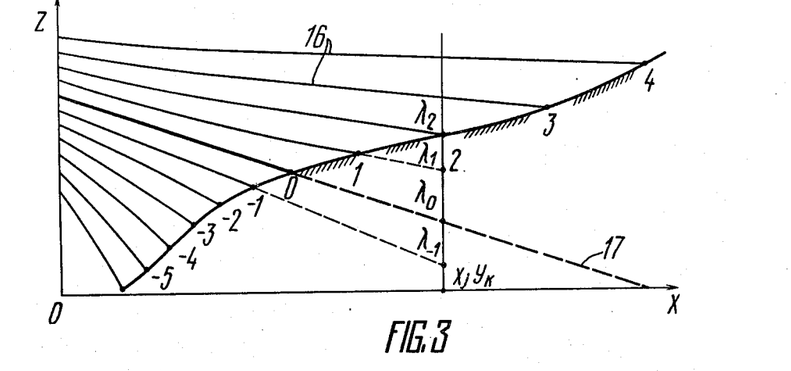
FIG. 3 diagrammatically illustrates surfaces of interference extremums in the area of intersection of diverging beams of coherent light, according to the invention.

If the intersecting beams of coherent light are not parallel, the interference extremum surfaces will not be planes. They will be actually hyperbolic or even more intricate surfaces (FIG. 3). The orientation and alternation period of the interference extremum surfaces 16 will differ in different sections of the area of intersection of the beams.

In compliance with the invention the device for determining geometric parameters of object's surface includes the assembly 7 (FIG. 1) which is used to determine attitude of the interference extremum surface 17 (FIG. 3) corresponding to the marked zero band 18 (FIG. 2b) hereinafter referred to as the marked zero extremum surface, and spatial distribution of the period of surfaces of all the interference extremums along the axis of the third coordinate OZ, i.e. normal to the prechosen coordinate plane OXY.

The assembly 7 (FIG. 1) for determining the attitude of surfaces of interference extremums and a period therebetween comprises the holder 8 with the photosensitive element 9 installed in a manner allowing displacement thereof and coordinate reading on three coordinates X, Y and Z in the area of intersection of the beams. The photosensitive element 9 may be a photodiode or a photomultiplier with a slit or a point diaphragm, or photographic film or plate. In the latter case the holder 8 is successively displaced into predetermined sections along the coordinate axis OX extended essentially in the same direction as the axis of symmetry of the beams projected onto the surface under investigation, while the photosensitive element 9 installed in each chosen section perpendicularly to said axis OX registers, during exposure, location of all surfaces of extremums including a zero extremum on the other two axes. The information on the coordinate X of the chosen sections is fed to the storage device 12 of the unit 10. The information on the coordinates Y and Z may be read out of the obtained images by the use of the unit 6 and fed to the storage device 12.

In the case of parallel beams of coherent light the information of the position of the zero surface and period distribution stored in the storage device 12 specifies essentially parameters levelling the zero plane in space, the value of period S between extremum planes and the value of angle $\theta$ (FIG. 2a) between the coordinate plane OXY and the extremum planes. The value $\Lambda = S/\cos \theta$ is the alternation period of the extremums along the axis of the third coordinate OZ.

When nonparallel beams intersect, the zero surface may be described by the equation $Z_o = F(X,Y)$ of a higher order of magnitude or even by a table, while the period distribution $\Lambda$ may be described by the analytical dependence on the coordinates X, Y, Z: $\Lambda = \Lambda(X,Y,Z)$ or by a table stored by the storage device: $\Lambda_{ijk} = \Lambda_i(X_j Y_k)$, where $i = [n] = 0, \pm 1, \pm 2, \ldots$ is the number of an interference extremum, $X_j, Y_k$ are coordinates of a nodal point of the coordinate grid.

The unit 6 is used to determine the number n of the band passing through nodal points of the coordinate grid with respect to the zero band and to feed said data to the storage device 12.

The unit 10 for determining a third coordinate adds up the periods $\Lambda_i(X_j, Y_k)$ between the extremum surfaces corresponding to n bands of the recorded pattern located between the zero band and the point of interest on the coordinate grid having the coordinates $X_j, Y_k$ including integral and fractional parts:

$$\Delta Z_{jk} = \sum_{i=0}^{[n]-1} \Lambda_i(X_j, Y_k) + \epsilon(n) \cdot \Lambda_{[n]}(X_j, Y_k) \qquad (3)$$

where [n] is an integral part of band n, $\epsilon(n)$ is a fractional part of the band in which the point of interest is located.

The obtained increment of the coordinate $\Delta Z_{jk}$ is added to the coordinate of the zero surface at the same nodal point of the coordinate grid whereby absolute value of the third coordinate $Z_{jk}$ at the point of interest on the investigated surface will be obtained:

$$Z_{jk} = \Delta Z_{jk} + F(X_j, Y_k) \qquad (4)$$

In the preferred embodiment the zero interference band is, according to the invention, marked by producing two similar interference patterns on the given surface, these patterns being characterized by a similar form of spatial distribution of the interference extremum surfaces and having periods differing by a constant factor, which periods being not multiples of each other. The two patterns are recorded and selection of the band coincident to both patterns as the zero band is made.

The two interference patterns may be obtained by projecting onto the surface two pairs of beams having a common plane of symmetry but different intersection angles $\alpha_1$ and $\alpha_2$ so that the values $\sin \alpha_1/2$ and $\sin \alpha_2/2$ are not multiples of each other or have different wavelength $\lambda_1$ and $\lambda_2$ which likewise are not multiples of each other. In the former case the obtained patterns may be separated by producing consecutive patterns, if the surface under investigation does not noticeably change throughout the given time interval or by producing pairs of light beams with mutually orthogonal polarization, the simultaneous step being the recording of the pattern by the use of polarizers. In the latter case it is advantageous that the patterns should be simultaneously recorded through narrow-band light filters passing light of wavelengths $\lambda_1$ and $\lambda_2$.

Figure 4:
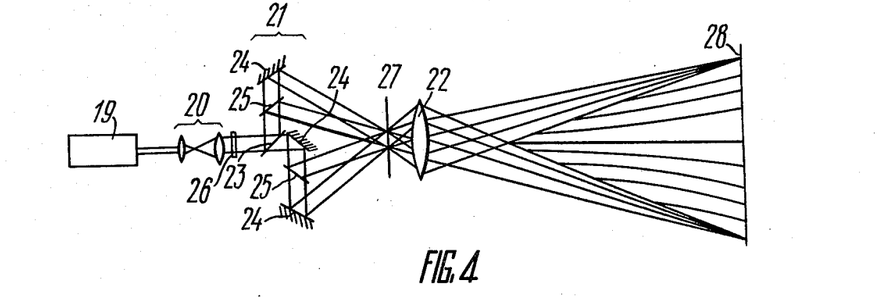
FIG. 4 diagrammatically depicts an embodiment of an optical system for producing two pairs of beams of coherent radiation differing as to an intersection angle, according to the invention.
Figure 5:
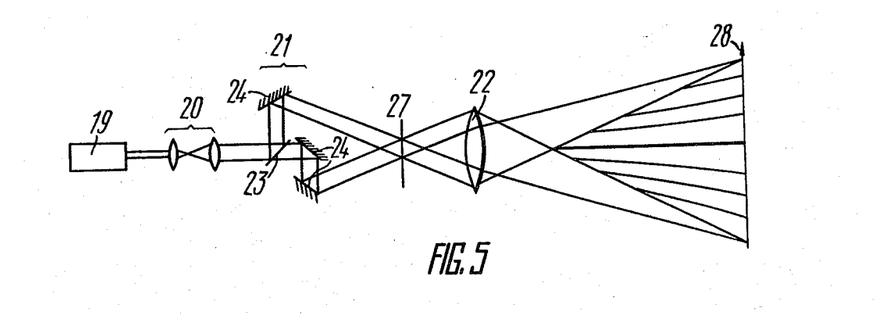
FIG. 5 shows another embodiment of an optical system utilizing radiation at two wavelengths according to the invention.

FIGS. 4 and 5 illustrate two embodiments of the optical system 1 (FIG. 1) for producing two pairs of beams of coherent radiation. The system is simultaneously used as the zero band marker. The illustrated systems include a laser 19, a collimating system 20, a mirror or prism splitter 21, and a lens system 22. In the first embodiment (FIG. 4) the laser 19 emits a beam of one wavelength, $\lambda$, which is expanded by the collimator 20 to a desired dimension. The splitter 21 includes a beam-splitter surface 23, opaque reflecting surfaces 24, and polarized splitter surfaces 25 reflecting light with polarization perpendicular to the incidence plane and passing the light with polarization parallel to the plane of light incidence on the surface 25. In addition, installed in front of the splitter 21 is an element 26 setting light polarization so that the above components are equal. Such an element may represent a $\lambda/4$ plate. The four beams are converged in a plane 27. The lens system 22 reflects the plane 27 to a plane 28 containing the object under investigation.

In the second case (FIG. 5) the laser 19 emits light on two wavelengths $\lambda_1$ and $\lambda_2$, which are multiples of each other. The wavelengths $\lambda_1 = 0.4880$ and $\lambda_2 = 0.5145\mu$ may be provided by an ion argon laser.

Figures 6, 7A, 7B:
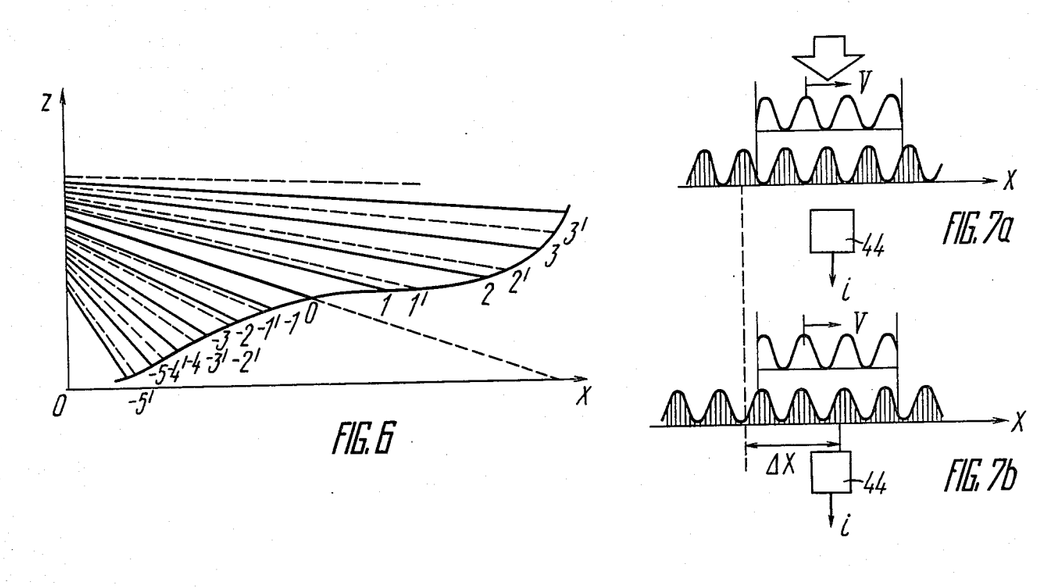
FIG. 6 diagrammatically depicts an area of intersection of two pairs of beams and the resultant two systems of interference extremum surfaces, according to the invention.
FIG. 7a diagrammatically shows distribution of light intensity of a pattern of moving interference bands and blackening density of photomaterial on which the pattern is recorded.
FIG. 7b illustrates the same condition as in FIG. 7a after the recorded pattern is displaced over a distance of Δ X.

FIG. 6 depicts an area of intersection of the beams in close proximity to the surface under investigation. In the drawing solid and dashed lines show interference extremum surfaces forming different interference patterns.

Since the beams in each pair are symmetrical to each other in the same plane of symmetry, the extremums of both interference patterns will coincide in said plane. Stated differently, the plane of symmetry will be the zero surface.

If factor K of interference pattern periods equalling $$K = \frac{S_2}{S_1} = \frac{\sin \alpha_{1/2}}{\sin \alpha_{2/2}}$$

in the first case and $$K = \frac{S_2}{S_1} = \frac{\lambda_2}{\lambda_1}$$

in the second case is a known quantity, the current numbers of bands $n_1$ and $n_2$ on the pair of recorded patterns may be determined even if the zero extremum surface does not intersect with the investigated section of the surface. This will be done by measuring a difference in the numbers of bands $\Delta n_1$ and $\Delta n_2$ between the same two points on the two patterns. So, we get a set of equations:

$$\begin{cases} n_1 = Kn_2 \\ n_1 + \Delta n_1 = K \cdot (n_2 + \Delta n_2) \end{cases}$$

Unknown quantities $n_1$ and $n_2$ will, thus, be determined. In the general case $n_1$, $n_2$, $\Delta n_1$ and $\Delta n_2$ are not whole numbers and may be either positive or negative.

The method forming the subject of the present invention permits determining geometric parameters of the surface of a moving object by producing an interference pattern on the surface by application of a train of short pulses. The pulse duration is synchronized either with preset process instants or with the expected positions of the object under investigation. Coherent radiation is, in this case, provided by a pulse source or a source having a controllable gate.

To provide high measuring accuracy and reliability, the number of the band on the recorded interference pattern will be determined using an additional pattern of moving interference bands having a size smaller than that of the recorded pattern and a period equal to or multiple of the period of bands on the recorded pattern, the steps involved being continual scanning with the centre of the additional pattern at two points set on two coordinates and converting the light of the additional pattern interacting with the recorded pattern into an electrical signal, whereupon the band number is determined including its integral and fractional parts by a variation of the phase of the alternating component of the obtained signal.

Figure 7C:
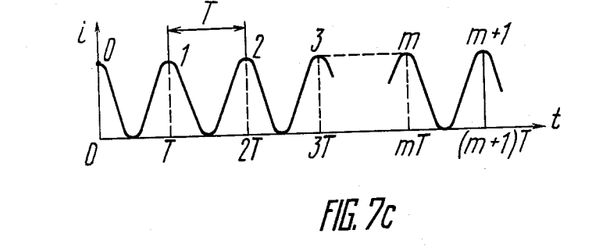
Figure 7D:
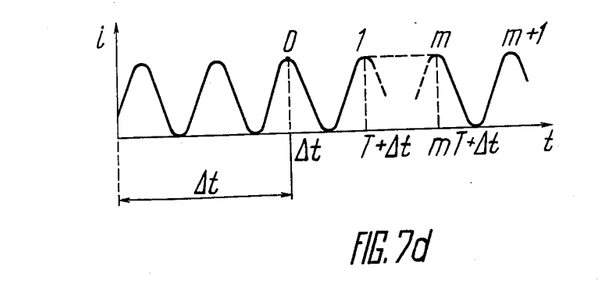
FIG. 7d illustrates the same condition as shown in FIG. 7c for the embodiment of FIG. 7b.

The proposed procedure for determining the number in measuring band increments is illustrated in FIGS. 7a and 7d.

Assume that at the initial moment $t=0$ the moving interference bands (corresponding to maximum illumination) coincide with interference bands of the recorded pattern (corresponding to minimum photosensitive layer blackening density as in FIG. 7a). In this case a maximum amount of light is passed through the recorded pattern and maximum photocurrent i is present at the output of a photodetector 44. As the moving interference bands travel at speed V, the value of the photocurrent i will periodically change at a frequency $f = V/L$, where L is a mean interval between the moving bands (FIG. 7c).

The photocurrent variation period equals $$T = 1/f = L/V \tag{5}$$

The photocurrent will be maximum at the moment $t_m = m \cdot T$.

Consider now that the recorded pattern is displaced over the distance $\Delta X$ (FIG. 7b). It is apparent that the moment when the moving bands coincide with the bands of the recorded interference pattern will be changed by the value (FIG. 7d)

$$\Delta t = \Delta X / V$$

Consequently, the variation phase will change as follows:

$$\Delta \phi = 2\pi \frac{\Delta t}{T} = 2\pi \frac{\Delta X}{L} \tag{6}$$

If the recorded pattern has been moved over a distance exceeding the chosen step, i.e.

$$\Delta X = [n] \cdot L + \Delta X_o,$$

where $\Delta X_o = \epsilon(n) \cdot L < L$, then $$\Delta \phi = 2\pi [n] + 2\pi \cdot \epsilon(n) \tag{7}$$

Stated differently, a whole number of phase variation periods represents a whole number of the scanned interference bands, while a fraction of phase variation period smaller than 2 represents a fractional part of the interference pattern during movement.

In compliance with the invention the unit 6 (FIG. 1) for determining the band number (see the block diagram of FIG. 8) comprises a two-coordinate measuring table 29 with coordinate transmitters 30 and electric drives 31. A recorded pattern 32 is found on the table, and an optical system produces a pattern of moving interference bands. The optical system includes a source of continuous-wave coherent radiation—a laser 33, a double-beam interferometer 34, a device for shifting light frequency in one beam of the interferometer 35 and a lens 36. Also an assembly 37 is provided for adjusting an interference pattern comprising a plane-parallel transparent plate 38, say, a glass plate, in the other beam of the interferometer on a two-axes hinge whose axes are mutually perpendicular and normal to the light beam axis. The hinge is provided with turn-angle transmitters 39 and electric drives 40. In addition, the unit for determining the band number includes a photoelectric detector 41 receiving radiation separated by a beam splitter 42 and a point diaphragm 43 from the central portion of the pattern of moving bands before interaction with the recorded pattern 32, and a photoelectric detector 44 receiving radiation after interaction with the recorded pattern.

Figure 8:
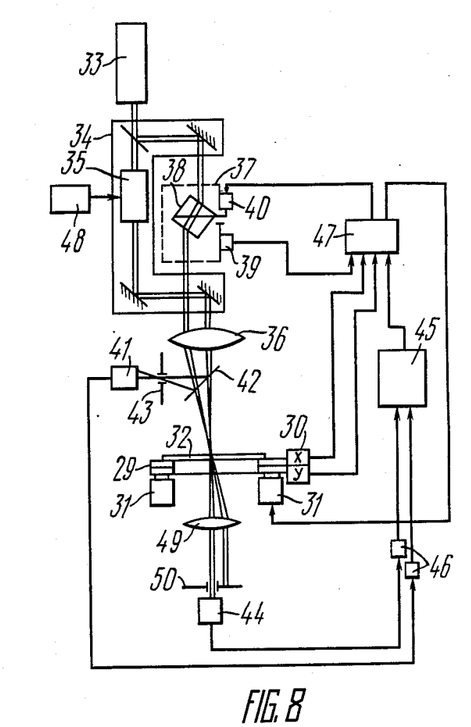
FIG. 8 is a block diagram of a unit 6 (FIG. 1) for precision measurement of a band number, according to the invention.

The device also comprises a phase-digital converter 45 having its inputs connected to the outputs of the photoelectric detectors 41, 44 through r-f filters 46 and a control microprocessor 47 having its inputs connected to the outputs of the phase-digital converter 45, to the coordinate transmitters 30 and to the turn-angle transmitters 39 of the interference pattern adjusting assembly, while the outputs of said microprocessor are coupled to the electric drives of the coordinate table 31 and the interference pattern adjusting assembly 40.

The device of FIG. 8 for determining the band number operates in the following manner.

A light beam from the laser 33 is split into two beams by the interferometer 34. One light beam from the interferometer is passed through the light frequency shifter 35 with the result that its frequency is changed by a value $\Omega$ set by a generator 48 in the r-f range from 10 kHz to 10 MHz. The other light beam from the interferometer is passed through the plane-parallel plate 38 of the assembly 37 disposed at a predetermined angle to the light beam axis with the result that it is subjected to a parallel shift determined by the value of said angle. Two parallel light beams at different frequencies are emitted from the interferometer. The two beams are focused and converge in the plane of the recorded pattern 32 on the coordinate table 29. A moving interference band pattern is formed as the above beams intersect.

A receiving lens 49 and a diaphragm 50 optically filter out the light dispersed and stopped in the recorded pattern bands so that the photodetector 44 receives only a portion of the spectrum of the fundamental spatial frequency of the recorded image corresponding to the mean frequency of the bands. An electrical signal at a frequency $\Omega$ is produced at the output of the photodetector 44. The beam splitter 42 and the point diaphragm 34 separate and pass to the photodetector 41 a part of radiation from the centre of the projected pattern of moving interference bands. An electrical signal at a frequency $\Omega$ is also produced at the output of the photodetector 41. A phase difference between the signals picked off from the detectors 41 and 44 is equal to the phase of interference bands of the recorded pattern in the centre of a measuring area formed by the additional pattern of moving interference bands, the accuracy being equal to a constant value. Moving the recorded pattern through one band changes a signal phase difference by the cycle $2\pi$. The phase-digital converter 45 converts a whole number of cycles and a fractional part of the phase variation into a digital code while the coordinate table is moved, the obtained data being stored in the microprocessor 47. The phases are counted at the scan point set by the microprocessor or simultaneously with coordinate measurements at predetermined moments.

Since the bands on the recorded image have a different period and direction, the spatial frequencies of the image and the projected pattern may be misaligned in scanning whereby a phase variation measurement may be upset and failure may result.

The above condition is prevented by tuning the spatial frequency of the projected pattern of moving bands to suit the image band frequency. Using the measured coordinates X, Y and band number n the microprocessor 47 computes the components of the image spatial frequency $\Delta n/\Delta X$ and $\Delta n/\Delta Y$, and compares the obtained result with the data furnished by the transmitters 39 of the interference pattern adjusting assembly. In the event of any disagreement said microprocessor feeds control signals to the electric drives 40 which change the angle of turn of the plane-parallel plate 37, thereby changing the angle between the intersecting beams and position of their propagation plane. Consequently, the frequency of the moving interference bands and their orientation will change until a desired agreement is obtained.

It should be noted that the device for determining the band number may be used to advantage for analyzing any images having a periodic structure such, for example, as interferograms, holograms, rastres, diffraction grating and the like.

The microprocessor 47 employed in the device for determining the band number may be an independent unit. If so, its output should be connected to the input of said main processor 11 (FIG. 1) to enable transmission thereto of data on the number of bands of the recorded pattern in given coordinates. However, the functions of the control microprocessor may be performer by the main processor. If so, the outputs of the phase-digital converter, transmitters of the coordinate table and the transmitters of the interference pattern adjusting assembly should be coupled to its inputs, while the control outputs of the main processor are connected to the actuators of the coordinate table and the interference pattern adjusting assembly.

What is claimed is:

1. A method for determining geometric parameters of an object's surface, wherein an increment of a third coordinate is measured at each point on the surface set by two coordinates, comprising the steps of:

producing an interference pattern on the surface under investigation by projecting two beams of coherent light onto said surface;

marking one of the interference bands for obtaining a reference zero band, said zero interference band being marked by producing two similar interference patterns characterized by similar form of spatial distribution of interference extremums and having periods differing by a constant factor, said periods being not multiples of each other, and subsequently recording said two patterns and selecting the band coincident on the two patterns as the zero band;

determining the attitude of an interference extremum surface corresponding to the marked zero band;

measuring the spatial distribution of a period of surfaces of all interference extremums along axis of said third coordinate;

recording said interference pattern;

determining an increment of the third coordinate with respect to the surface of said zero band at desired points having two preset coordinates by adding up periods of extremum surfaces of respective bands disposed between the zero band and the desired points.

2. A method as claimed in claim 1, wherein the parameters of a moving object are measured by producing interference patterns on an object's surface on application of a train of short pulses.

3. A method as claimed in claim 1, wherein the number of the band on the recorded pattern is determined using an additional pattern of moving interference bands having a size smaller than that of the recorded pattern and a period equal to or multiple of the band period on the recorded pattern, the steps involved being continual scanning with the additional pattern at points set on the two preset coordinates, conversion of the light of the additional pattern after interaction with the recorded pattern into an electrical signal, and determination of the band number including its integral and fractional parts by a variation of phase of an alternating component of the obtained signal with respect to the signal phase at points of the recorded pattern disposed in the zero band.

4. A device for determining geometric parameters an object's surface by measuring an increment of a third coordinate at each surface point set by two coordinates, comprising:

an optical system for producing two beams of coherent light and projecting them at an angle with respect to each other onto a surface under investigation to form an interference pattern on said surface;

a photorecording means for recording the interference pattern formed on said surface;

a marker for separating a reference zero band on the object's surface;

an assembly for determining the attitude of surfaces of interference extremums and a period therebetween, including a holder with a photosensitive element installed in a manner allowing movement thereof on three axes along and across the beams in the area of their intersection and an indicator for recording the respective coordinates;

a unit for setting two coordinates of points on the object surface;

a unit for determining a band number on the recorded interference pattern;

a unit for measuring a third coordinate of points on the surface, including a processor with a storage device connected to the unit for setting two coordinates, to the unit for determining the band number with respect to the zero band on the recorded pattern and to the assembly for determining attitude of surfaces of interference extremums and a period therebetween, and designed so as to allow summation of the periods depending on the number of the bands disposed between the zero band and the desired point, including integral and fractional parts, with due account taken of the periods in the sectional area corresponding to the two measured coordinates of the point of interest and assure its addition to the third coordinate of the zero band extremum surface in the same sectional area whereby absolute value of the third coordinate of the given point on the surface will be obtained.

5. A device as claimed in claim 4, wherein the unit for determining the band numder includes a two-stage co-ordinate table with coordinate transmitters and electric drives, the recorded pattern being found on said table, an optical system for producing a pattern of moving interference bands with a source of continuous-wave coherent radiation, an assembly for adjusting an interference pattern of moving bands with transmitters and electric drives, a photoelectric detector receiving radiation separated from the central portion of the pattern of moving interference bands before interaction with the recorded pattern, and a photoelectric detector receiving radiation after interaction with the recorded pattern, a phase-digital converter whose inputs are connected to the outputs of the photoelectric detectors through r-f filters, and a control processor having its inputs coupled to the output of said phase-digital converter, to the transmitters of the coordinate table and to the transmitters of the assembly for adjusting the interference pattern, while the outputs of said control microprocessor are connected to the electric drives of the coordinate table and the assembly for adjusting the interference pattern.

* * * * *